UNITED STATES PATENT OFFICE.

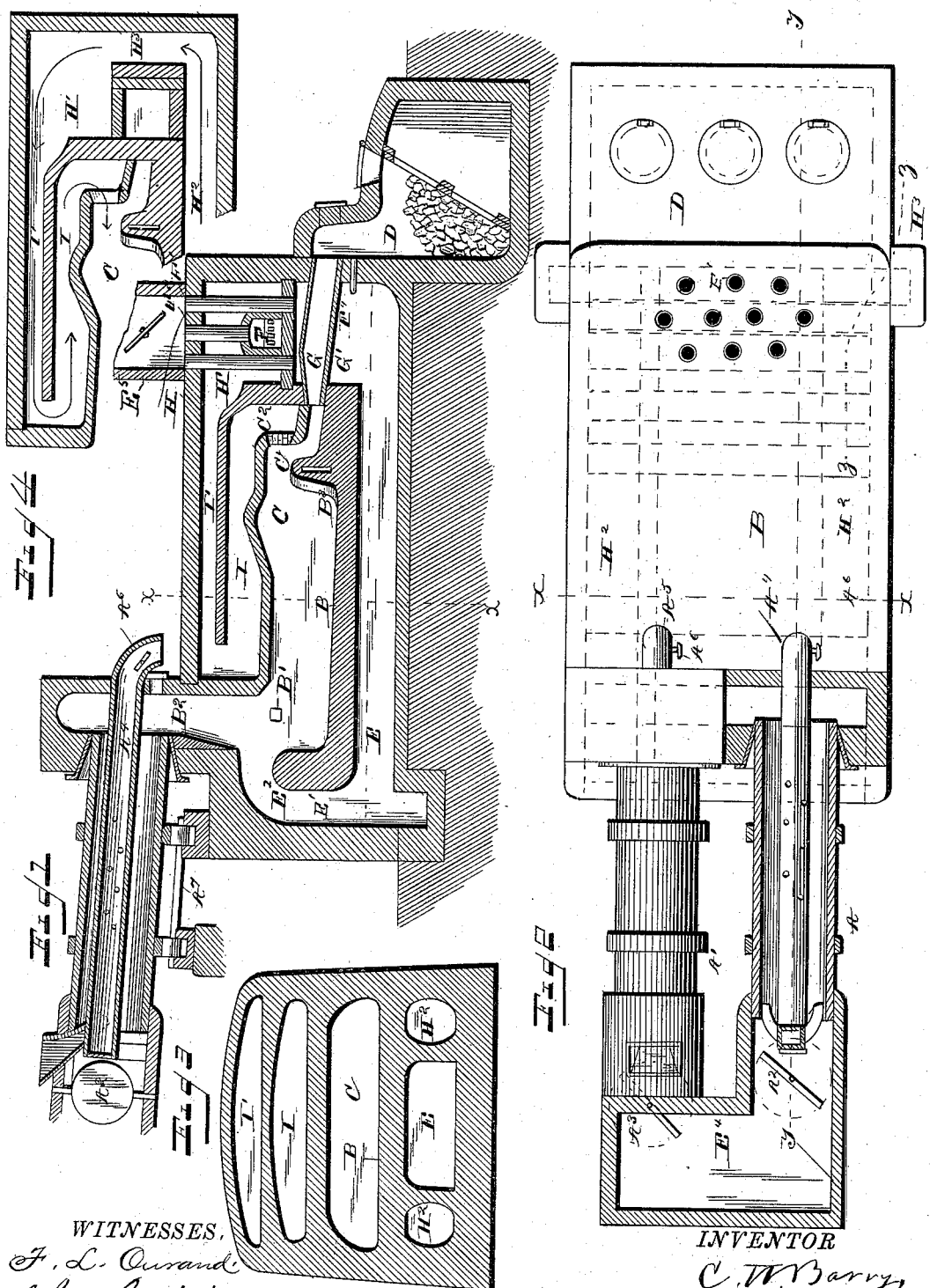

CALEB W. BARRY, OF KEOKUK, IOWA.

ORE-SMELTING FURNACE.

SPECIFICATION forming part of Letters Patent No. 385,229, dated June 26, 1888.

Application filed December 29, 1886. Serial No. 222,856. (No model.)

*To all whom it may concern:*

Be it known that I, CALEB W. BARRY, of Keokuk, in the county of Lee and State of Iowa, a citizen of the United States, have invented a new and useful Improvement in Ore-Smelting Furnaces, which is made and used substantially as set forth hereinafter and as shown in the accompanying drawings, in which—

Figure 1 is a sectional elevation of furnace, taken on line $y$ of Fig. 2. Fig. 2 is a top view, partly sectional, of same. Fig. 3 is a cross-section of same on line $x$. Fig. 4 is a partial sectional elevation taken on line $z$ of Fig. 2.

The object of this invention is to prepare and smelt ores, such as those of a miscellaneous nature which contain precious metals, lead, copper, &c., and which are often smelted several kinds together in suitable mixtures of ores, or ores and other materials, arranged to contain materials for the proper chemical reactions of smelting in different cases.

To this end the invention consists in the peculiar and improved construction of various parts and the general arrangement of the parts to promote this purpose in a peculiar and advantageous manner, substantially as shown and set forth hereinafter.

The apparatus comprises two rotary roasting and preparing cylinders, $A$ $A'$; a smelting and finishing hearth, $B$, having a combustion-chamber, $C$, over it, arranged to receive and act upon ores as discharged from the two cylinders, and to supply the same with hot gases for treating the ores therein; a gas-producer, $D$, arranged to supply a combustible gas for burning in chamber $C$ to heat hearth $B$; a diving return-flue, $E$, from the rear end of hearth $B$ to bring the surplus hot gases from chamber $C$ to the front for heating the ingoing gases and air-supply; an auxiliary furnace, $F$, to heat the ingoing gases and air for combustion; two systems of heat-withstanding pipes, $G$ $H$, to separate the ingoing gases and air from the products of combustion used to heat them; a double chamber, $I$ $I'$, over chamber $C$, to heat ingoing air, and two chimneys to produce draft, $E^4$ $F^3$.

The two rotary cylinders $A$ $A'$ are made with fire-proof linings and with suitable means for feeding ores to them and for supporting and rotating them. They are mounted side by side on rollers $A^7$, by which they are rotated, and are connected at one end through a fume-depositing chamber with a chimney, and at the other with the uptake $B^2$ from combustion-chamber $C$, into which they are arranged to discharge the ores when suitably treated, and from which they are arranged to receive hot gases of combustion from chamber $C$ to heat and treat the ores in them. They are each connected with an outlet-flue leading to chimney $E^4$, provided with separate outlet-valves $A^2$ $A^3$. A separate air-inlet cylinder, $A^4$ $A^5$, is located in each of the rotary cylinders and the uptake $B^2$ to supply the rotary cylinders with air for acting on the ores, each air-cylinder being regulated by its separate valve $A^6$.

Smelters of this class have not been adapted to treat continuously a miscellaneous collection of ores and materials, such as are often smelted together, and which vary in the amounts of heat and air they require to suitably prepare them. This is provided for by the two cylinders $A$ $A'$, with their air-pipes $A^4$ and their valves to control separately the heat and air in each. The air-pipes $A^4$ have uptake bends to promote the inflow and pass through the cylinders and are firmly supported at each end outside.

The ores and fluxes to be smelted together, which require previous roasting or calcining, are divided into two classes when they are of such character as to require different treatments, and these classes are treated separately in the two cylinders, each with the special amount of heat and air and length of treatment and other circumstances suited thereto. For instance, rich fusible and volatile sulphides and chlorides, which require moderate heat and air to roast them, are treated thereto in one cylinder, $A$, with or without salt, as required, and others—such as oxides and carbonates of iron and lime for fluxes and some of the refractory sulphides which require calcination—are treated thereto in the other cylinder, $A'$, with or without carbon, as required.

The hearth $B$ is made with its floor inclined downward to the end from uptake $B^2$. The ores and fluxes, after treatment at the rear end, where they fall from the cylinders $A$ $A'$, and where those which do not require or are not suited to the treatments therein are introduced by a door, B', in the side or by a hopper above, are drawn forward for finishing in front when in suitable condition. Suitable doors and openings are provided in the walls of the furnace for manipulating and removing the materials on hearth B.

The hearth B is provided with an elevated dam-wall, $B^3$, in front, which has an upward gas-passage, C', in front of and over it to the combustion-chamber C. An air-inlet, $C^2$, made of checker brick-work, is provided in front of the fire-chamber C and over the gas-inlet C', arranged so that air and gas will come together from these two inlets C' $C^2$ and burn in chamber C to heat the materials on hearth B and to furnish heat for the cylinders A A' and for heating the incoming gas and air.

The gas-producer D is made and operated in any suitable way to produce combustible gases. These gases pass up to the pipes G, through which they pass through the heating-chamber G' to the uptake-inlet C'. These pipes G are made of iron or other suitable heat-withstanding materials, and are made with a suitable central bulge or enlargement to strengthen them where they bridge over the space between the walls of chamber G', where they are highly heated by the products of combustion from chamber C and from furnace F. In passing through these pipes G the incoming gas is very highly heated by such hot products of combustion preparatory to being burned in chamber C, by which the heat on hearth B is greatly increased.

The products of combustion in chamber C pass out uptake $B^2$ to whatever extent is required to heat the cylinders A A', which is controlled by the valves $A^2$ $A^3$, and the remainder pass out by a passage, $E^2$, in the rear and through a downtake, E', to the diving-flue E, by which they pass under hearth B to the chamber G', around pipes G, where they heat the ingoing gases, and from this they pass out by the uptake-pipes H, through air-chamber H', to heat the ingoing air and escape up chimney $E^5$. The pipes H are formed of earthenware or other suitable materials which will withstand the heat and the air of chamber H'. They are made in lengths of one, two, or more sections, suitably secured, and built in the arches above and below.

The auxiliary furnace F is fed with air and fuel through doors in the sides of the apparatus, and its gases escape up pipe $F^2$ to the chimney $E^5$. This heats air for chamber C, which passes through chamber H'. The air for smelting comes in at the rear ends of flues $H^2$, in the sole of the furnace on each side of the waste-gas flue E, and passes up by passages $H^3$ from them, as illustrated in Fig. 4, into the chamber H', where it is heated by pipes F' $F^2$ from the escape-flue E and furnace F. From chamber H' the air passes back by a passage, I', in the roof of the furnace and descends into a lower passage, I, in the same furnace-roof, where its heat is increased. It passes forward through this passage I and descends to the open brick-work inlet $C^2$, by which it passes into the combustion-chamber C against the current of gases from producer D, at C', so as to burn them and heat hearth B. Gases from the producer D pass by a pipe, $F^4$, under pipes G, in chamber G', where they are burned to heat the gases passing from the producer through pipes G, and also to heat the air in chamber H'. In this way this supplements the heat of the waste gases and of furnace F for heating the ingoing gases and air and increasing the heat of chamber C.

This furnace is specially arranged for working sulphides and other ores, such as contain gold and silver, copper and lead, and other valuable metals.

The ores and materials adapted for use in smelting the same are assorted into such lots and combinations as are adapted for working together in different cases. Those which require roasting or calcination are passed through cylinders A A', as already indicated, and are then intermixed on the back part of hearth B with such as do not require or are not suited to such treatment, which are introduced by a side door and are finished on the front part of hearth B. The treatment on this hearth is varied to suit the various kinds of ores and the objects in view in each case. In this way metals are reduced to a lead bullion, to a copper matte, or to other product. The slag and products are removed by tap-holes or doors in the sides, suitably arranged therefor.

I claim—

The combination of a smelter chamber and hearth having a diving return-flue for waste gases arranged in its sole, a gas-producer connected to said chamber, and means for heating the air-supply to said chamber, consisting of air-supply flues located in said sole, an air-heating chamber provided with pipes connected with said waste-gas flue, and air-heating flues located in the furnace-roof and connecting said air-heating chamber with said smelter chamber or hearth.

CALEB W. BARRY.

Witnesses:
WM. B. WADSWORTH,
H. H. KNOWLTON.